(12) United States Patent
Haddad

(10) Patent No.: US 8,710,691 B2
(45) Date of Patent: Apr. 29, 2014

(54) WIND DRIVEN GENERATOR FOR VEHICLES

(76) Inventor: Rahamim Haddad, Tel-Aviv (IL)

( * ) Notice: Subject to any disclaimer, the term of this patent is extended or adjusted under 35 U.S.C. 154(b) by 608 days.

(21) Appl. No.: 13/002,508

(22) PCT Filed: Jul. 5, 2009

(86) PCT No.: PCT/IL2009/000671
§ 371 (c)(1),
(2), (4) Date: Jan. 31, 2011

(87) PCT Pub. No.: WO2010/004551
PCT Pub. Date: Jan. 14, 2010

(65) Prior Publication Data
US 2011/0156404 A1  Jun. 30, 2011

Related U.S. Application Data

(60) Provisional application No. 61/078,415, filed on Jul. 6, 2008.

(51) Int. Cl.
*H02P 9/04* (2006.01)

(52) U.S. Cl.
USPC ............................................. 290/55; 290/44

(58) Field of Classification Search
USPC .............................. 290/43, 55, 44, 54; 322/35
See application file for complete search history.

(56) References Cited

U.S. PATENT DOCUMENTS

| | | | | |
|---|---|---|---|---|
| 3,556,239 A * | 1/1971 | Spahn | 180/65.25 |
| 4,141,425 A * | 2/1979 | Treat | 180/2.2 |
| 4,168,759 A * | 9/1979 | Hull et al. | 180/2.2 |
| 4,423,368 A * | 12/1983 | Bussiere | 322/35 |
| 5,280,827 A * | 1/1994 | Taylor et al. | 180/165 |
| 5,680,032 A * | 10/1997 | Pena | 290/52 |
| 6,054,838 A * | 4/2000 | Tsatsis | 320/101 |
| 6,138,781 A * | 10/2000 | Hakala | 180/2.2 |
| 6,700,215 B2 * | 3/2004 | Wu | 290/44 |
| 6,857,492 B1 * | 2/2005 | Liskey et al. | 180/165 |
| 6,882,059 B1 * | 4/2005 | DePaoli | 290/44 |
| 6,897,575 B1 * | 5/2005 | Yu | 290/44 |
| 7,135,786 B1 * | 11/2006 | Deets | 290/55 |
| 7,547,983 B2 * | 6/2009 | Sabella | 290/40 C |
| 7,665,554 B1 * | 2/2010 | Walsh | 180/2.2 |
| 7,802,641 B2 * | 9/2010 | Friedmann | 180/2.2 |
| 7,810,589 B2 * | 10/2010 | Frierman | 180/2.2 |
| 8,098,040 B1 * | 1/2012 | Botto | 320/101 |
| 8,240,416 B2 * | 8/2012 | Cong | 180/165 |
| 8,344,534 B2 * | 1/2013 | Owens | 290/44 |
| 8,434,574 B1 * | 5/2013 | York et al. | 180/2.2 |
| 8,436,485 B1 * | 5/2013 | Smith | 290/55 |
| 2003/0155464 A1 | 8/2003 | Tseng | |

* cited by examiner

*Primary Examiner* — Nicholas Ponomarenko
(74) *Attorney, Agent, or Firm* — AlphaPatent Associates Ltd.; Daniel J. Swirsky

(57) ABSTRACT

A wind-driven electricity generating system for a vehicle being at least partially electrically-powered by a battery. The wind-driven system includes an air intake unit having a plurality of inner walls forming at least one airflow channel. The airflow channels includes an air scoop forming an inlet opening, and an air exhaust forming an outlet opening, wherein the air scoop faces the forward moving direction of the vehicle, and positioned in airflow communication with the inlet opening. The wind-driven system further includes at least one turbine positioned in airflow communication with respective air outlet opening, and an electric generator operatively coupled with said at least one turbine. The air intake unit is preferably attached to the vehicle roof. The electric generator is operatively connected to the battery of the vehicle, thereby at least partially recharging the battery, when the vehicle is in forward motion.

7 Claims, 5 Drawing Sheets

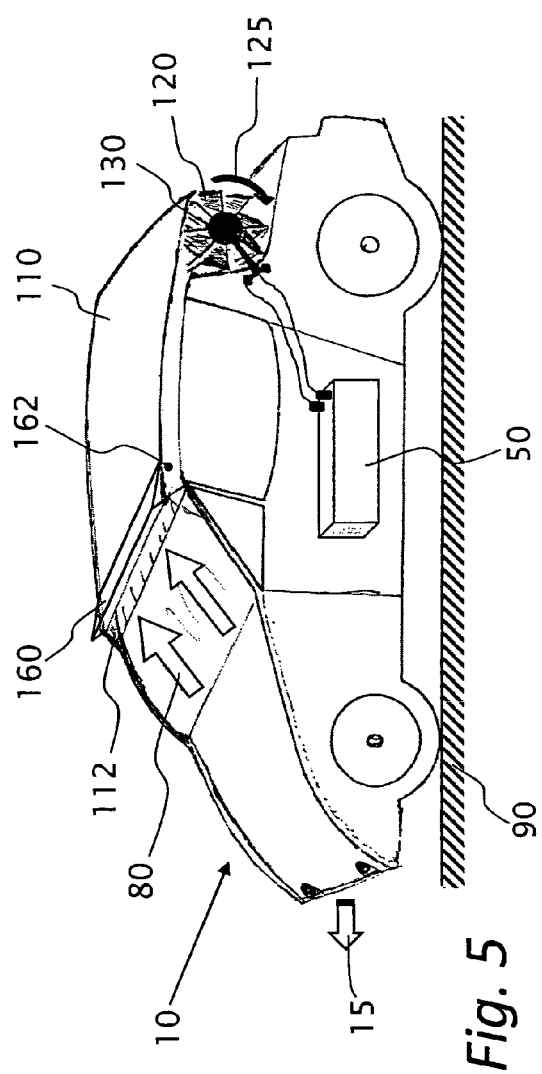
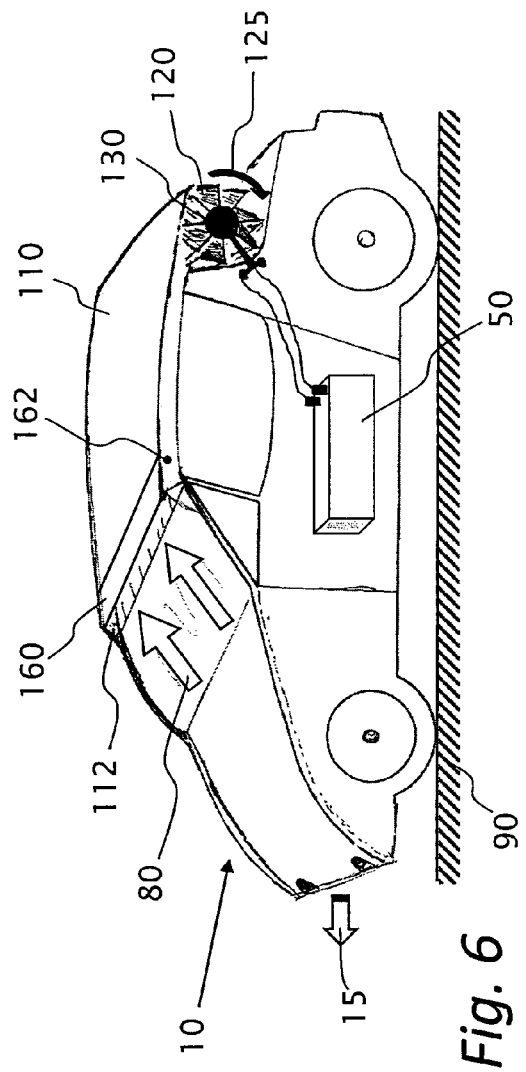

WIND DRIVEN GENERATOR FOR VEHICLES

CROSS-REFERENCE TO RELATED APPLICATIONS

The current application is a U.S. National Phase Application under 35 U.S.C. 371 of PCT International Application No. PCT/IL2009/000671, which has an international filing date of Jul. 5, 2009, and which claims the benefit of priority from U.S. Provisional Patent Application No. 61/078,415, filed Jul. 6, 2008, whose disclosure is incorporated herein by reference.

FIELD OF THE INVENTION

This invention relates to electricity generating systems and methods for vehicles and more particularly the present invention relates to electricity generating system for charging an electrically powered vehicle battery and for operating electric devices of a vehicle, utilizing a wind-operated turbine and an electricity generating device operatively attached thereto, while the vehicle is in motion.

BACKGROUND OF THE INVENTION AND PRIOR ART

Increasing cost of gasoline and increasing awareness to environmental pollution have increased the use of electrically-powered vehicles or hybrid vehicles, that are known to solve some of the problems associated with gasoline-powered vehicles, but such vehicles are not yet in widespread use.

Electrically-powered vehicles have certain drawbacks as compared to vehicles powered by conventional gasoline engines and newer hybrid vehicles. The drawbacks include limited travel range between battery recharging and excessive time and power resources required for recharging the batteries. Furthermore, typically, it takes a relatively long time to recharge the batteries, compared with gasoline fill-up, during which time the vehicle remains inoperative.

There is therefor a need for and it would be advantageous to have an electrically-powered vehicle with a significant increase of the travel range between battery recharging events. One way to increase the travel range of electrically-powered vehicles is to charge the batteries while the vehicle is in motion. Typically, this has been accomplished by using wind resistance to generate electrical power. Many variations on this theme have been described in the art, but all have inherent limitations. Accordingly, there is still a continuing need to develop more efficient ways to charge batteries while the vehicle is in motion. The present invention fulfills this need and further provides related advantages.

SUMMARY OF THE INVENTION

The principal intentions of the present invention include proving a wind-driven electricity generating system for at least partially recharging an at least partially electrically-powered land, air or water vehicle.

According to teachings of the present invention there is provided a wind-driven electricity generating system for a vehicle, the vehicle having a body and a back section and is at least partially electrically-powered by a battery mounted in the vehicle. The wind-driven electricity generating system includes an air intake unit having a plurality of inner walls forming at least one airflow channel. Each of the airflow channels includes an air scoop forming an inlet opening, and an air exhaust forming an outlet opening, wherein the air scoop faces the forward moving direction of the vehicle, and wherein the airflow channel is positioned in airflow communication with the inlet opening. The wind-driven electricity generating system further includes at least one turbine positioned in airflow communication with respective air outlet opening, and an electric generator operatively coupled with said at least one turbine. The air intake unit is sealingly attached to an external surface of said body of said vehicle, preferably the vehicle roof. The electric generator is operatively connected to the battery of the vehicle, thereby at least partially recharging the battery, when the vehicle is in forward motion.

While the vehicle is in motion, air flows over the car hood, then over the windshield and is collected by the air intake unit. From the air intake unit the air is directed onto a wind turbine and thereby rotating the turbine. The turbine in turn rotates an electric generator that converts the rotational force into electricity, which is used to recharge the batteries of the at least partially electrically-powered vehicle.

Preferably, the wind-driven electricity generating system further includes a side rib disposed on each side rim of the windshield of the vehicle, generally perpendicular to the windshield, thereby preventing flow of air from departing the surface of the windshield, sideways. Thereby increasing the quantity of air flowing into the air intake unit.

Preferably, the wind-driven electricity generating system further includes a side rib disposed on each side rim of the upper surface of the front wheels cover of the vehicle, generally perpendicular to the hood of the vehicle, thereby preventing flow of air from departing the surface of the hood, sideways. Thereby increasing the quantity of air flowing into the air intake unit.

Preferably, the surface of the side ribs facing the windshield is essentially flush with the surface of the side ribs facing the hood.

In variations of the present invention, the air scoop further includes an adjustable lip, thereby allowing changing the areal size of said inlet opening.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIG. 5 is a side perspective view illustration of an electrically-powered vehicle, as shown in FIG. 1, including an adjustable air scoop shown in an open state; and FIG. 6 is a side perspective view illustration of an electrically-powered vehicle, as shown in FIG. 1, including an adjustable air scoop shown in a closed state.

DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The methods and examples provided herein are illustrative only and not intended to be limiting.

By way of introduction, the principal intentions of the present invention include proving a wind-driven electricity generating system mounted on at least partially electrically-powered vehicle, for charging the vehicle battery using the wind power electricity generating system, or for operating electrical devices of the vehicle and thereby reducing the load over to vehicle battery.

Figure 1:
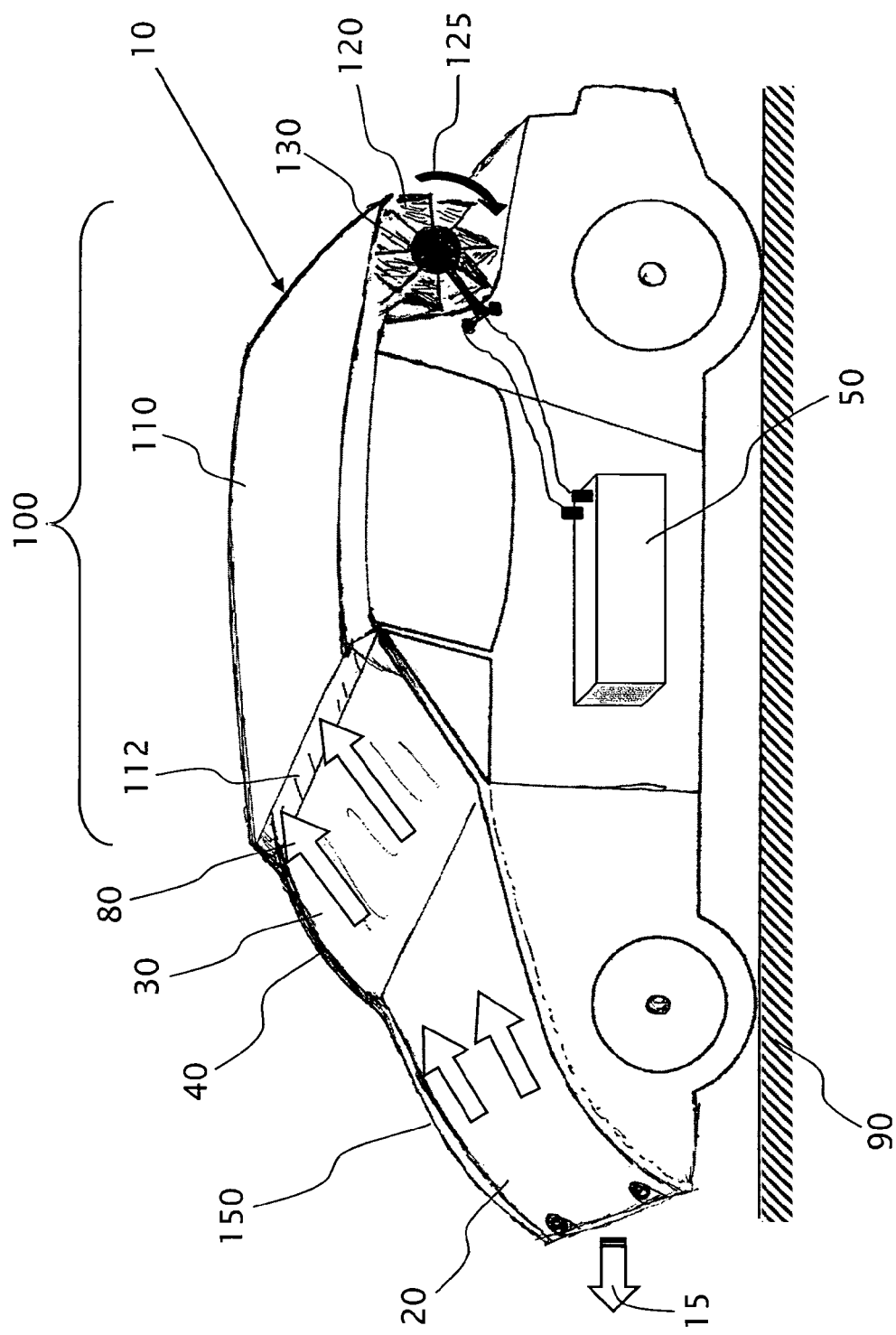
FIG. 1 is a side perspective view illustration of an electrically-powered vehicle having a wind-driven battery charging system, according to embodiments of the present invention.
Figure 2:
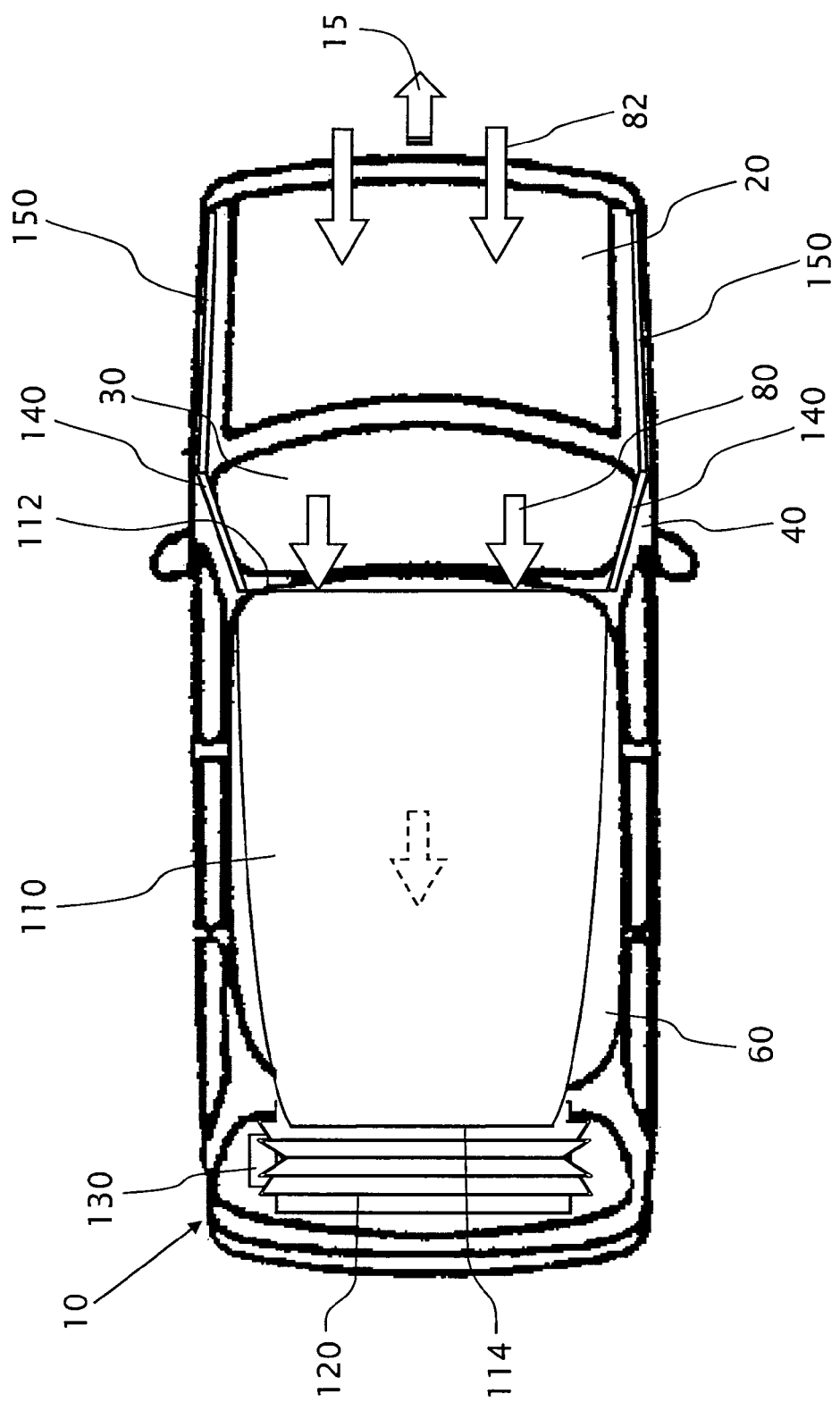
FIG. 2 is a top view illustration of an electrically-powered vehicle, as shown in FIG. 1.
Figure 3:
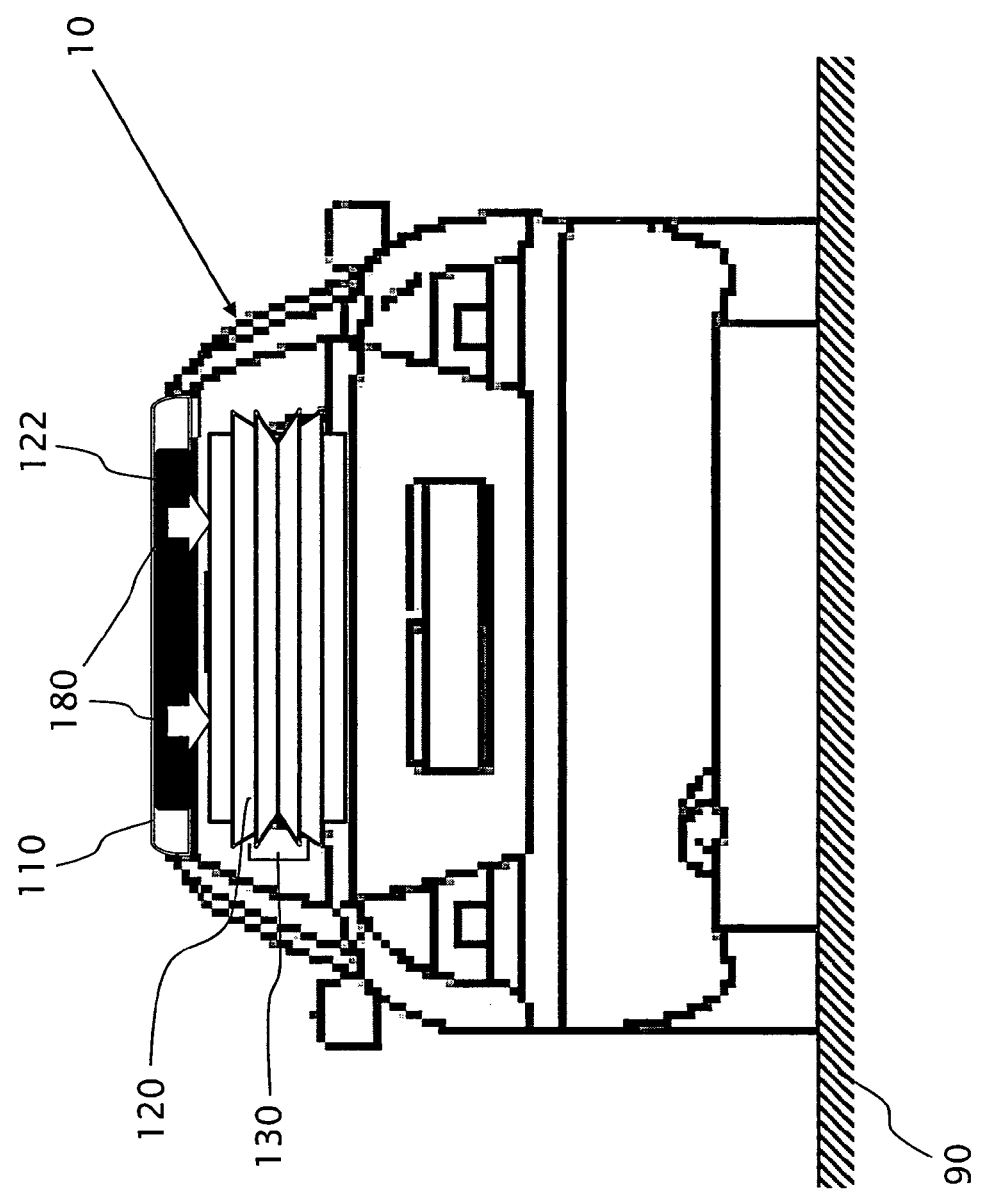
FIG. 3 is a back view illustration of an electrically-powered vehicle, as shown in FIG. 1.

Reference is now made to FIG. 1, which is a side perspective view illustration of an at least partially electrically-powered vehicle 10 having a wind-driven electricity generating system 100, according to embodiments of the present invention. Reference is also made to FIG. 2, which is a top view vehicle 10 having wind-driven electricity generating system 100; and to FIG. 3, which is a back view illustration of vehicle 10 having wind-driven electricity generating system 100.

Wind-driven electricity generating system 100 includes an air intake unit 110 disposed on roof 60 of vehicle 10. System 100 further includes wind turbine 120, typically mounted at the back of vehicle 10. Air intake unit 110 operatively rotates wind turbine 120 about the turbine shaft being substantially parallel to road surface 90 and substantially perpendicular to the vehicle direction of motion 15. As shown in FIG. 1, the airflow channel is disposed only on the roof 60 of the vehicle, thus the airflow channel is not curved. And, turbine 120 is disposed adjacent and below roof 60, thereby the length of the airflow channel is not greater than the length of roof 60. The length of turbine 120 is larger than the length of air outlet opening 114. The length of turbine 120 is long enough for occupying most of the width of the vehicle. Thus, the cross-sectional area of the airflow channel is relatively large. The uncurved shape, the small length, and the large cross section improve the effectiveness of the air flow supplied to turbine 120.

Air intake unit 110 includes a plurality of inner walls forming at least one airflow channel, an air inlet opening 112 and an air outlet opening 114. The flow of air, while vehicle 10 is in motion, flows over hood 20, then over windshield 30 and is then collected by air intake unit 110. From air intake unit 110 the air is directed through air outlet opening 114 onto wind turbine 120 and thereby rotating turbine 120. Turbine 120 in turn, rotates electric generator 130 that converts the rotational force into electricity, which is used to at least partially recharge batteries 50 of vehicle 10, while the electrically-powered vehicle is in motion in forward direction (15). Preferably, the combined area of the effective surface of turbine 120 is large and thereby can produce a relatively large quantity of electricity.

In preferred embodiments of the present invention, the areal size of air outlet opening 114 of air intake unit 110 are smaller with respect to the areal size of air inlet 112, thereby the air flowing towards and out of outlet opening 114 is condensed and thereby the velocity of the out flowing air is larger than the velocity of air entering air intake unit 110 through air inlet 112.

In embodiments of the present invention, wind-driven electricity generating system 100 may further includes ribs 150 that form a small wall to prevent flow of air from departing the surface of hood 20 sideways, and thereby maximizing the quantity of air flowing in direction 82 towards air intake opening 112. Side ribs 140, similar to ribs 150, may also be mounted on side rims 40 of windshield 30 to prevent flow of air from departing the surface of windshield 30 sideways, and thereby maximizing the quantity of air flowing in direction 80 towards air intake opening 112.

The air flowing out of air outlet opening 114 flows in direction 180 (see FIG. 3) onto wind turbine 120 and thereby rotating turbine 120 in direction 125. Turbine 120 in turn, rotates electric generator 130 that converts the rotational force into electricity. The larger the force embedded in the air flowing in direction 180, the faster the rotational speed of turbine 120 and of electric generator 130 yielding larger electrical power. The nozzle of air outlet opening 114 is preferably designed to set air flow direction 180 to optimally rotate turbine 120. For example, if turbine 120 is a blade turbine, direction 180 is perpendicular to the absorbing face of each blade.

Figure 4:
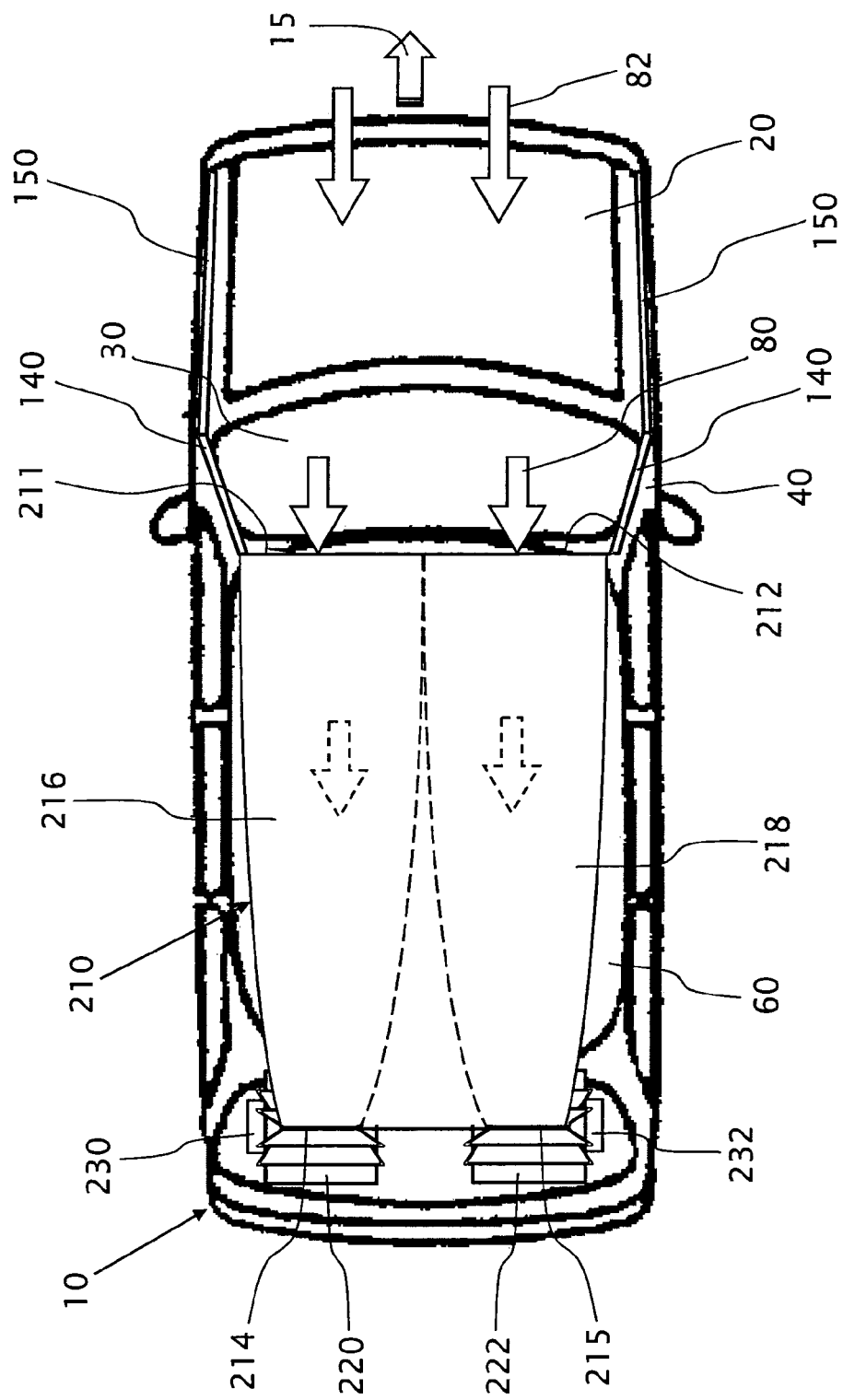
FIG. 4 is a top view illustration of an electrically-powered vehicle having a wind-driven electricity generating system, according to variations of the present invention.

Reference is now made to FIG. 4, which is a top view illustration of an electrically-powered vehicle 10 having an wind-driven electricity generating system, according to variations of the present invention, the system including an air intake unit 210 disposed on roof 60 of vehicle 10. Air intake unit 210 includes two separate airflow channels (216 and 218) for the inflowing air in direction 80. Air flows into airflow channel 216 through inlet opening 211 and out of outlet opening 214 onto respective wind turbine 220, typically mounted at the back of vehicle 10. Air also flows into airflow channel 218 through inlet opening 212 and out of outlet opening 215 onto respective wind turbine 222, also typically mounted at the back of vehicle 10. Air intake unit 110 operatively rotates wind turbines 220 and 222 about respective turbine shafts being substantially parallel to road surface 90 and substantially perpendicular to the vehicle direction of motion 25. Turbines 220 and 222 operatively rotate one or more respective electric generators (230 and/or 232) that convert the rotational force into electricity. In variations of the present invention, the air intake unit includes multiple airflow channels, each coupled with a wind turbine. Each wind turbine maybe coupled with one or more electric generators. Two or more wind turbines may also operatively rotate a single electric generator.

It should be noted that, that when more than one turbine rotate a single electric generators, the turbines and the electric generators are disposed on a single shaft.

In variations of the present invention, the air scoop of the air inlet opening (112, 211, 212) is adjustable, thereby changing the areal size of the air inlet opening (112, 211, 212). Reference is made to FIG. 5, which is a side perspective view illustration electrically-powered vehicle 10, including an adjustable air scoop 160, shown in an open state, and to FIG. 6, in which adjustable air scoop 160 is shown a closed state. Adjustable air scoop 160 may be used, for example, while driving downhill, when air scoop 160 can be, for example, opened pivotally about axis 162, to increase the air intake and thereby increase the electricity production, in spite of the lessening in the vehicle aerodynamics. In another example, air scoop 160 is opened when the drivers activates the brakes.

In embodiments of the present invention, one or more air intake units 110 are located on external surfaces of vehicle 10 other than on roof 60, including the vehicle sides, the vehicle engine hood and the vehicle bottom.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A wind-driven electricity generating system for a vehicle, said vehicle having a body and a back section and being at least partially electrically-powered by a battery mounted in said vehicle, the system comprising:
   a) an air intake unit having a plurality of inner walls forming airflow channel comprising an air scoop forming an inlet opening, and an air exhaust forming an outlet opening;
   b) turbine, being rotatable perpendicular to the vehicle direction of motion, said turbine positioned in airflow communication with said air outlet opening; and
   c) an electric generator operatively coupled with said turbine, wherein said air intake unit is sealingly attached to an external surface of said body of said vehicle;
   wherein said air scoop faces the forward moving direction of said vehicle; wherein the airflow channel is positioned in airflow communication with said inlet opening; and
   wherein said electric generator is operatively connected to said battery of said vehicle thereby at least partially recharging said battery, said vehicle being in forward motion; and
   wherein said airflow channel is disposed only on a roof (60) of the vehicle,
      thereby said airflow channel substantially is not curved, and
      thereby said turbine (120) being positioned in airflow communication with said air outlet opening (114) is disposed substantially adjacent and below the roof, thereby diminishing length of said airflow channel; and
   wherein a length of said turbine (120) is larger than a length of said air outlet opening (114), and occupying at least 70% of a width of said vehicle at said turbine location, thereby enlarging a cross-sectional area of said airflow channel,
   thereby improving air flow supplied to said turbine.

2. The wind-driven electricity generating system of claim 1, wherein external surface of said body of said vehicle is the vehicle roof and said turbine is disposed at said back section of said vehicle.

3. The wind-driven electricity generating system of claim 1, wherein the areal size of said outlet opening is smaller than the areal size of said inlet opening, whereby air flowing from said inlet opening towards said outlet opening is condensed, and thereby the velocity of the air flowing out of said outlet opening is larger than the velocity of air entering said air intake unit through said inlet opening, said vehicle being in forward motion.

4. The wind-driven electricity generating system of claim 1, further comprising a side rib disposed on each side rim of the windshield of said vehicle, generally perpendicular to said windshield, thereby preventing flow of air from departing the surface of said windshield, sideways.

5. The wind-driven electricity generating system of claim 4, further comprising a side rib disposed on each side rim of the upper surface of the front wheels cover of said vehicle, generally perpendicular to the hood of said vehicle, thereby preventing flow of air from departing the surface of said hood, sideways.

6. The wind-driven electricity generating system of claim 5, wherein said side ribs of said rims include an inner surface facing said windshield, wherein said side ribs of said upper surface of said front wheels covers include an inner surface facing said hood, and wherein said inner surface of said side ribs of said rims are essentially flush with respective inner surface of said side ribs of said upper surface of said front wheels covers.

7. The wind-driven electricity generating system of claim 1, wherein said air scoop further comprises an adjustable lip, thereby allowing changing the areal size of said inlet opening.

* * * * *